United States Patent [19]

Yajima et al.

[11] 4,429,268

[45] Jan. 31, 1984

[54] SPEED CONTROL FOR STEP MOTORS

[75] Inventors: Torao Yajima; Yoshifumi Gomi, both of Shiojiri, Japan

[73] Assignee: Kabushiki Kaisha Suwa Seikosha & Epson Corporation, Tokyo, Japan

[21] Appl. No.: 244,936

[22] Filed: Mar. 18, 1981

[30] Foreign Application Priority Data

Mar. 19, 1980 [JP] Japan .................................. 55-34930

[51] Int. Cl.³ ............................................ H02K 29/02
[52] U.S. Cl. ...................................... 318/696; 318/685
[58] Field of Search ................................ 318/696, 685

[56] References Cited

U.S. PATENT DOCUMENTS 3,986,094 10/1976 Quiogne et al. ..................... 318/696

Primary Examiner—V. Truhe
Assistant Examiner—Saul M. Bergmann
Attorney, Agent, or Firm—Blum, Kaplan, Friedman, Silberman & Beran

[57] ABSTRACT

A speed control for step motors is provided with a speed control circuit for periodically actuating a motor driving circuit at least in part in response to timing signals representative of the incremental advance of the step motor during acceleration. The time interval between the respective actuations of the motor driving circuit during acceleration is stored in a memory, the speed control circuit actuating the motor driving circuit during deceleration of the step motor at intervals which are a function of the stored acceleration intervals in the memory, applied in reverse order.

28 Claims, 10 Drawing Figures

SPEED CONTROL FOR STEP MOTORS

BACKGROUND OF THE INVENTION

This invention relates to speed control of step motors, and in particular, to a closed loop speed control arrangement for step motors used to drive print heads of printing devices.

In the art, open loop driving methods have been used for step motors wherein no detector is provided for detecting the position or rate of rotation of the step motor. The "phase change" timing (as used herein, the term "phase change" refers to a change in the coil or coils of the step motor to which driving current is applied to effect driving) required for acceleration of the motor from a stopped position, deceleration of the motor from a moving state or constant speed operation, is selected in advance by calculation from a control curve experimentally determined and stored in a memory. Thus, by way of example, where a microprocessor or micro-computer controlled circuit is provided for driving the step motor, the abovementioned data for speed control is stored in a ROM. At the time that the driving of the step motor is to start, the first pre-determined stored time period is read from the memory and at the time that the first stored time period comes to an end, phase change (driving) of the motor is performed and, simultaneously, the next time period is read from the memory. This procedure is followed repetitively with the interval between successive phase changes following the program of stored time periods. In this way, the motor speed is raised to a constant speed.

The driving force $f_{sT}$ required to rotate a step motor for one step may be defined as follows:

$$f_{sT} = m \frac{d^2x}{d(t_sT)^2} + fu \quad (1)$$

where x represents the amount of rotation, m is the mass of the load, $t_sT$ is the time necessary to rotate the motor for the amount x, and fu is the kinetic friction force of the load.

Integrating equation (1) above, the following equation is obtained:

$$f_{sT} = \frac{2mx}{(t_sT)^2} + fu \quad (2)$$

During a constant speed period, the time period of the phase change required for constant speed rotation is set. Each time that the time period comes to an end, the phase is changed. The above action is repeated to drive the motor at a constant speed. During deceleration, as noted above, the calculated time period between phase changes is stored in memory. As the motor enters the deceleration condition, the first calculated time period is read out of the memory. At the end of that first time period, phase change is effected and the next time period is read out from the memory. This procedure is repeated until the motor slows and finally stops.

In such open loop control, where the motor is to be advanced only a slight incremental angle, half of a predetermined number of steps or phase changes are used for acceleration control and the remaining steps are used for deceleration control.

Accordingly, the prior art open loop step motor driving arrangements are characterized by calculated intervals of phase change based on anticipated acceleration and deceleration characteristics of the step motor. However, this prior art step motor speed control approach is characterized by certain disadvantages. First, this approach does not prevent vibration during acceleration or deceleration caused by variations in the power supply or variations of the load on the stepping motor. FIG. 1 illustrates this vibration, showing a curve wherein the ordinate represents the step distance (incremental advance) of the step motor while the abscissa represents the time elapsed. Times $T_a$ through $T_{a+9}$ each represent one of the predetermined time periods calculated in advance for acceleration or deceleration control and stored in the memory.

Still another disadvantage of the prior art speed control approach is that the motor's speed cannot respond to driving pulses of the predetermined time period when the driving system of the step motor is locked for a period of time. This results from the fact that the interval between phase changes (driving) of the step motor is fixed by the pre-calculated time periods and does not take into account intervals where the driving system of the step motor is locked.

In U.S. Pat. No. 3,863,118, a closed-loop speed control system for step motors is taught wherein, after initial driving by an external pulse, the motor is driven by feedback pulses from a transducer connected to the motor output, the transducer being in the form of an optical position detecting device. An adjustable time delay is provided in the feedback loop for adjusting the effective switching angle or phase change time interval, the interval being in turn controled by a comparator, which compares an external timing signal with the feedback signal. By providing an apparatus for detecting and storing the time intervals between the phase changes during acceleration and using the same time intervals in reverse order to control phase changes during deceleration and/or by controlling the application of the phase change signal in response to the later of the end of a predetermined time period and a timing pulse representative of an incremental advance of the step motor, the foregoing disadvantages of the prior art are overcome and an improved speed control for step motors is provided. Further, by providing a driving circuit for the step motor having a diode for checking inverse current inserted between the excited coil and the excited current switching circuit provided for controlling the supply of current to the excited coil of each phase, where said drive circuit includes a spike-suppressor circuit, an improved step motor results.

SUMMARY OF THE INVENTION

Generally speaking, in accordance with the invention, a speed control for step motors is provided, including detector means for producing timing pulses representative of the incremental advance of the step motor, motor driving means for incrementally driving said step motor, and speed control circuit means for periodically actuating said motor driving means at least in part in response to said timing pulses during the acceleration of said step motor, said speed control circuit means including memory means for storing the time interval between actuations of said motor driving means during acceleration, said speed control circuit means being adapted to actuate said motor driving means during deceleration at intervals substantially representative of the stored intervals in said memory means applied in reverse order.

The speed control circuit means may be adapted to actuate said motor driving means during acceleration and constant speed operation in response to the later of a predetermined time period and said timing pulses. Two detector means may be provided, one associated with the forward direction of rotation of the step motor, the other being associated with the reverse direction of rotation of the step motor. The motor driving means may include a diode for checking inverse current between each excited coil and the excited current switching circuit for controlling supply to that excited coil, and a spike-suppressor circuit.

Accordingly, it is an object of the invention to provide a speed control for a step motor wherein the vibration of the motor caused by variations in power supply or variations in load is avoided during motor acceleration and deceleration.

Another object of the invention is to provide a step motor having good constant speed control.

A further object of the invention is to provide a speed control which can be used for step motors incrementally advanced over small angles, wherein vibration is avoided during acceleration and deceleration, especially where no period of constant current rotation is utilized.

Still a further object of the invention is to provide an improved stepping motor drive circuit.

Still other objects and advantages of the invention will in part be obvious and will in part be apparent from the specification.

The invention accordingly comprises the features of construction, combination of elements, arrangement of parts and the several steps and the relation of one or more of such steps with respect to each of the others, which will be exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 2:
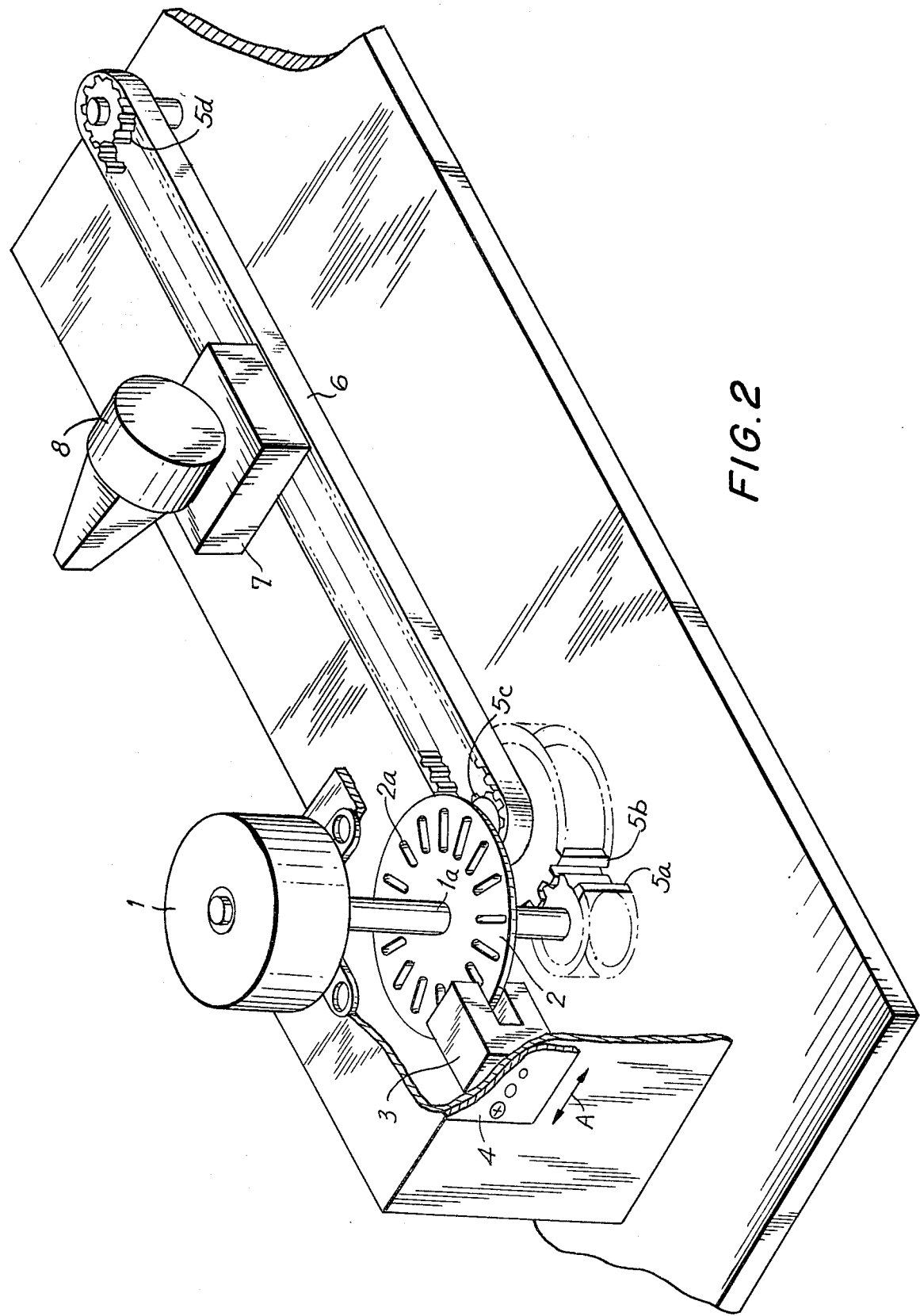
FIG. 2 is a fragmentary perspective view of a dot head carrier driving mechanism of a dot printer in accordance with the invention.

Referring now to FIG. 2, the dot head carrier driving mechanism for a dot printer depicted includes a step motor 1 having a timing disc 2 mounted on the output shaft 1a thereof. Timing disc 2 is provided with a plurality of radially extending slits 2a therethrough, one such slit generally being provided for each "step" required for one revolution of step motor 1. The distance between each slit is determined by dividing the timing disc into equal parts, corresponding to the number of steps necessary for one revolution of step motor 1. The respective slits are detected by an optical-type timing detector 3 of conventional construction, generally consisting of a light source such as a light emitting diode positioned on one side of the timing disc and a light sensitive device such as a photodiode on the opposite side of the disc. Timing detector 3 is mounted on a substrate 4. A plurality of mounting holes is provided on the substrate, whereby the substrate may be mounted in a plurality of positions displaced in the direction represented by arrow A. A driving gear 5a is mounted on shaft 1a and is in driving engagement with a driven gear 5b of a selected gear ratio. Driven gear 5b is coupled for rotation with a belt-driving gear 5c which supports one end of and drives a timing belt 6. The other end of the timing belt 6 is supported on a freely rotatable gear 5d. A dot head carrier is coupled to timing belt 6 for lateral displacement in response to the displacement of the step motor 1. A dot head 8 usable for printing is mounted on the dot head carrier for displacement thereby.

In the arrangement of FIG. 2, it is possible to detect more precisely the position of dot head carrier 7 during the reciprocal displacement thereof, by disposing two timing detectors 3, either associated with the same timing disc 3, a different group of slits on timing disc 2 or a separate timing disc. This permits the separate control of the displacement of the dot head carrier in each direction of its displacement, either by alternative control of a common speed control timing circuit (see FIG. 6) or by provision of separate speed control timing circuits. The need for two such timing detectors arises from the fact that there is a difference in the most suitable phase change timing between the two directions of reciprocal travel of the dot head carrier driving mechanism, caused by various factors. Accordingly, it is preferable to provide two such timing detectors, particularly where the driving frequency of the step motor is high.

Figure 3:
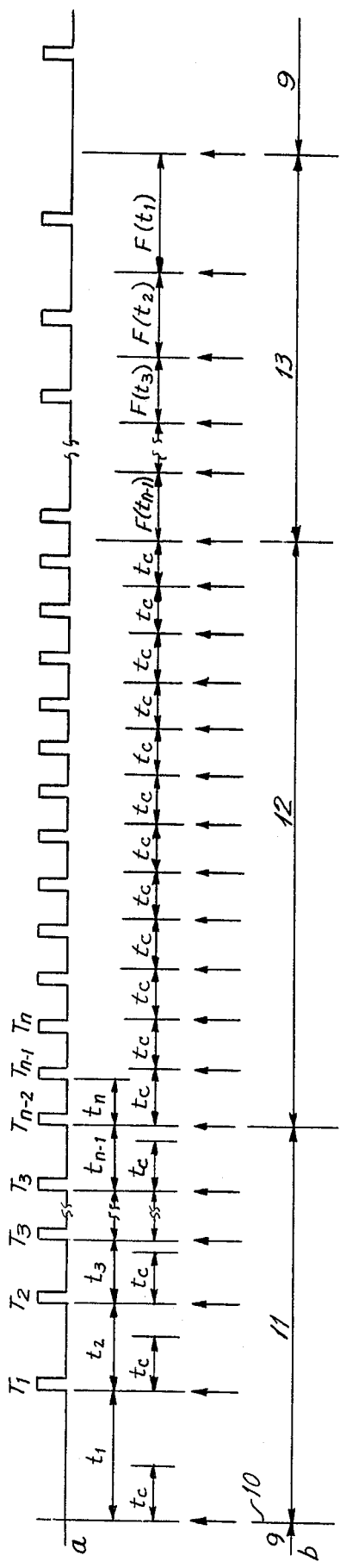
FIG. 3 is a drive timing chart for the dot head carrier driving mechanism of FIG. 2.

Referring now to FIG. 3, a timing chart for a speed control circuit in accordance with the invention as particularly adapted to the dot head carrier mechanism of FIG. 2 is depicted. The left-most region of FIG. 3 represents a period 9 at which the step motor is at rest. Reference numeral 10 represents the drive starting time at which the step motor driving circuit is actuated for the first time. Reference numeral 11 refers to the period of acceleration, reference numeral 12 refers to the period of constant speed drive and reference numeral 13 refers to the period of deceleration, all of these periods being under the control of a speed control circuit as more particularly described below.

The step motor 1 is of the type which, when stopped, is excited with a certain phase, a selected one or more of the coils thereof being energized. To actuate the motor to commence displacement, this phase is changed, a different coil or coils are energized, each change being represented by an arrowhead in wave form b of FIG. 3 which represent phase change timing. At the starting time 10, the first actuation of motor 1 (phase change) is effected and motor 1 begins to rotate. At the same time as the phase is changed, a timer, as will be more particularly described below, is set to be actuated for measuring the timing pulse interval $t_c$. Interval $t_c$ is the interval between actuation or phase changes during the constant speed control period 12. Wave form a of FIG. 3 shows the timing pulses, the pulses produced by timing detector 3. In accordance with the invention, if the first timing pulse $T_1$ is not produced during the time $t_c$ as measured from starting time 10, phase change and therefore the further actuation of the step motor 1, is effected upon the output of the timing pulse $T_1$. In other words, during the acceleration period 11, the interval between phase changes is determined by the later of the period $t_c$ and the occurrence of the next timing pulse. Simultaneous with each phase change, the above-mentioned timer is reset to measure, once again, time period $t_c$. The above procedure is repeated until the motor enters the condition where timing pulse $T_n$ is produced during the predetermined period $t_c$, at this stage, constant speed control period 12 is reached and phase change is effected at the end of each period $t_c$, since the timing pulse occurs prior to the end of the period.

During the acceleration period 11, the respective time intervals $t_1, t_2, \ldots, t_{n-1}$ between the starting time 10 and the first timing pulse $T_1$ and between said first timing pulse and successive timing pulses until timing pulse $T_{n-1}$, respectively, are stored in a memory as more particularly described below. These time intervals may be referred to as time $t_m$ where $m=1, 2, \ldots, n-1$.

As noted above, in the constant speed control period 12, it is usual that the timing pulse is produced during the time period $t_c$, so that the motor phase change is effected at the end of the time period $t_c$, the timer being reset at that time. However, it is possible that the timing pulse is not produced during the period $t_c$ because motor speed has decreased due to the rapid increase in the motor load. In this case, phase change is synchronized with the output of the timing pulse and the timer is reset at this later time, as is the case during the acceleration period. During the constant speed control period 12, the time interval between timing pulses is not stored in memory, so that constant speed control for step motor 1 can be achieved by repeating the above-mentioned process.

When the number of steps (generally timing pulses) from drive starting time 10 reaches value $L-(n-1)$, where L equals the predetermined total number of steps required for driving the step motor over the prescribed distance, motor 1 enters the deceleration period 13. In the deceleration period, the ideal brake force $f_{sp}$ required for one step of motor 1 in the carriage driving system of FIG. 2 may be defined as follows:

$$f_{sp} = m \frac{d^2x}{d(t_{sp})^2} - fu \quad (3)$$

where m equals the mass of the load, in this case of the carriage driving system, x equals the distance that the motor is rotated in one step during deceleration, $t_{sp}$ equals the time required to decelerate over the distance x, and fu is the kinetic friction force on the load, in this case the carriage driving system.

When equation (3) is integrated, time $t_{sp}$ may be expressed as follows:

$$t_{sp} = \sqrt{\frac{2mx}{fu + f_{sp}}} \quad (4)$$

If factors other than kinetic friction force are ignored, the ideal braking condition is obtained when $f_{sT}=f_{sp}$. From equations (2) and (4), the following relationship between $t_{sp}$ and $t_{sp}$ is obtained:

$$t_{sp} = t_{sT}\sqrt{\frac{mx}{mx + (t_{sT})^2 \cdot fu}} \quad (5)$$

Accordingly, it has been found that there is a definite functional relationship, as indicated by equation (5) or the like, between the time $t_{sT}$ necessary for one step rotation of the motor in the acceleration period and the time $t_{sp}$ necessary for one step rotation of the motor in the course of the desired speed control during deceleration. If the kinetic friction force fu is so small as to be disregardable, it is possible to consider $t_{sp}$ to be approximately equal to $t_{sT}$.

Taking the foregoing into consideration, at the time that the last phase change is accomplished in the constant speed control period, the timer resets the actuator for the time period $F(t_{n-1})$, expressed as a definite function of the last time interval $t_{n-1}$ of the timing pulses detected and stored during the acceleration period. At the expiration of this stored time period $F(t_{n-1})$, the phase change is effected and the timer is reset to the period $F(t_{n-2})$, also expressed as a function of the time interval $t_{n-2}$ between timing pulses $T_{n-3}$ and $T_{n-2}$ of the acceleration period 11 as stored in the memory. Accordingly, during the deceleration period, phase change is effected at intervals which are a function of the intervals between the starting time 10 and the first timing pulse $T_1$ and between the successive timing pulses $T_1, T_2, \ldots, T_{n-1}$, taken in inverse order, all said time periods having been stored during the acceleration period 11. This process is repeated until the last phase change is carried out at the end of the time period $F(t_1)$ which is a function of the time period $t_1$, bringing the deceleration period to an end. By reason of the above-described method, the dot head 8 of FIG. 2 can be smoothly driven through both acceleration and deceleration without substantial influence on such driving by variations in the supply voltage or variations in the load. Moreover, extremely good print quality can be realized, since the print timing of the dot head is synchronized with the rise of the timing pulses and with the timing obtained by dividing the time interval between the timing pulses during constant speed drive into periods of equal length.

Figure 5:
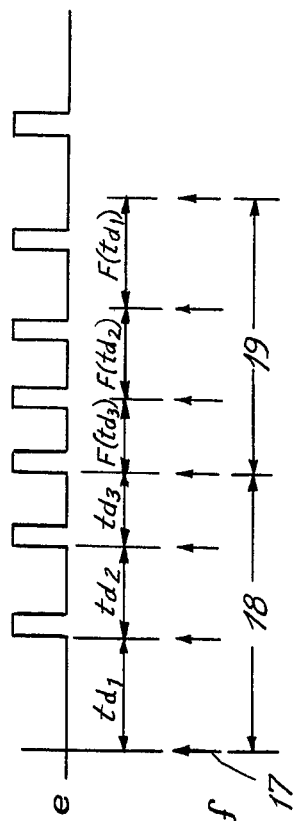
FIGS. 4 and 5 are timing charts illustrating two embodiments of the driving of the dot head carrier driving mechanism of FIG. 1 along incremental short distances in accordance with the invention.
Figure 4:
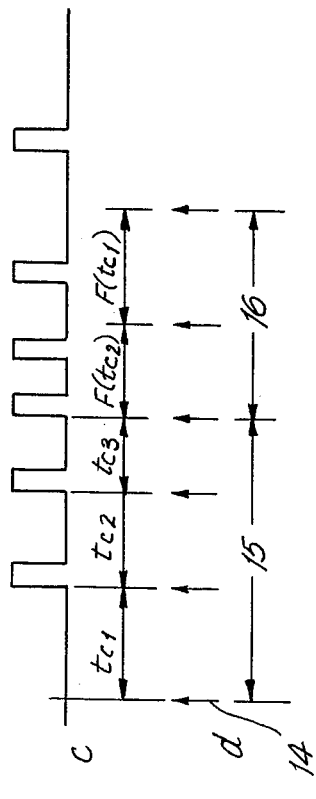

When dot head carrier 7 is incrementally traversed over only a short distance, it is necessary to drive the stepping motor in accordance with one of the timing charts illustrated in FIGS. 4 and 5, wherein there is no period of constant speed. This results from the fact that the step motor would be advanced over too great a distance if the constant speed period is incorporated in the cycle.

FIG. 4 illustrates a speed control method based on the actuating of the step motor in an even-numbered number of steps, in this example, six steps. Wave form c depicts the timing pulses while wave form d depicts the phase change signal as represented by arrowheads. When the phase is changed at the drive starting time, as indicated by reference numeral 14, the step motor enters an acceleration period. The time period $t_{c1}$ between drive starting time 14 and the first timing pulse is detected and stored in memory. Phase change is effected by the first timing pulse and the intervals between said first timing pulse and the second timing pulse $t_{c2}$ is stored in the memory when phase change is next effected by the second timing pulse. The foregoing process is repeated until the [(total number of steps)/2]+1 'th (fourth, for example in the embodiment of FIG. 4) phase change is effected. This marks the end of acceleration period 15 and the beginning of deceleration period 16. In deceleration period 16, a number of phase changes equal to [(total number of steps)/2]−1 phase changes are effected, in the example of FIG. 4, two phase changes. Specifically, a timer would be set at a period which is a function of the time interval before the last time interval, $t_{c2}$, a time interval designated as $F(t_{c2})$. In other words, the stored time period $t_{c2}$ is utilized to determine the period after which the next phase change is effected, and the time period prior to period $t_{c2}$, period $t_{c1}$, is used to determine the period when the last phase change is effected, a period represented by $F(t_{c1})$. In summary, each of the time periods during the acceleration period 15 is stored, except the last period, and each of the stored periods are used in inverse order to determine the period between phase changes in the deceleration period 16 until deceleration is complete.

FIG. 5 illustrates the method of speed control utilized where the step motor is driven by an odd numbered number of steps. In this embodiment, the number of steps of acceleration period 18 and deceleration period 19 are equal. The first phase change is performed at the drive starting time 17, at which time the motor begins to rotate. In the acceleration period, the time interval is between the starting time 17 and the first timing pulse and between successive timing pulses thereafter is detected and stored in memory. During the deceleration period, the time intervals thus stored are utilized as the basis of the time period between successive phase changes, in inverse order. By way of example, where seven steps constitute a cycle of rotation necessary for the incremental advance of the step motor the desired distance, after the initial phase change at time 17, three further phase changes at intervals of $t_{d1}$, $t_{d2}$ and $t_{d3}$ are effected. Thereafter, deceleration is effected by the application of three phase changes at intervals defined as $F(t_{d3})$, $F(t_{d2})$ and $F(t_{d1})$. This process is illustrated by the timing signals of wave form e and the phase change signals as represented by arrowheads in wave form f of FIG. 5.

Figure 6:
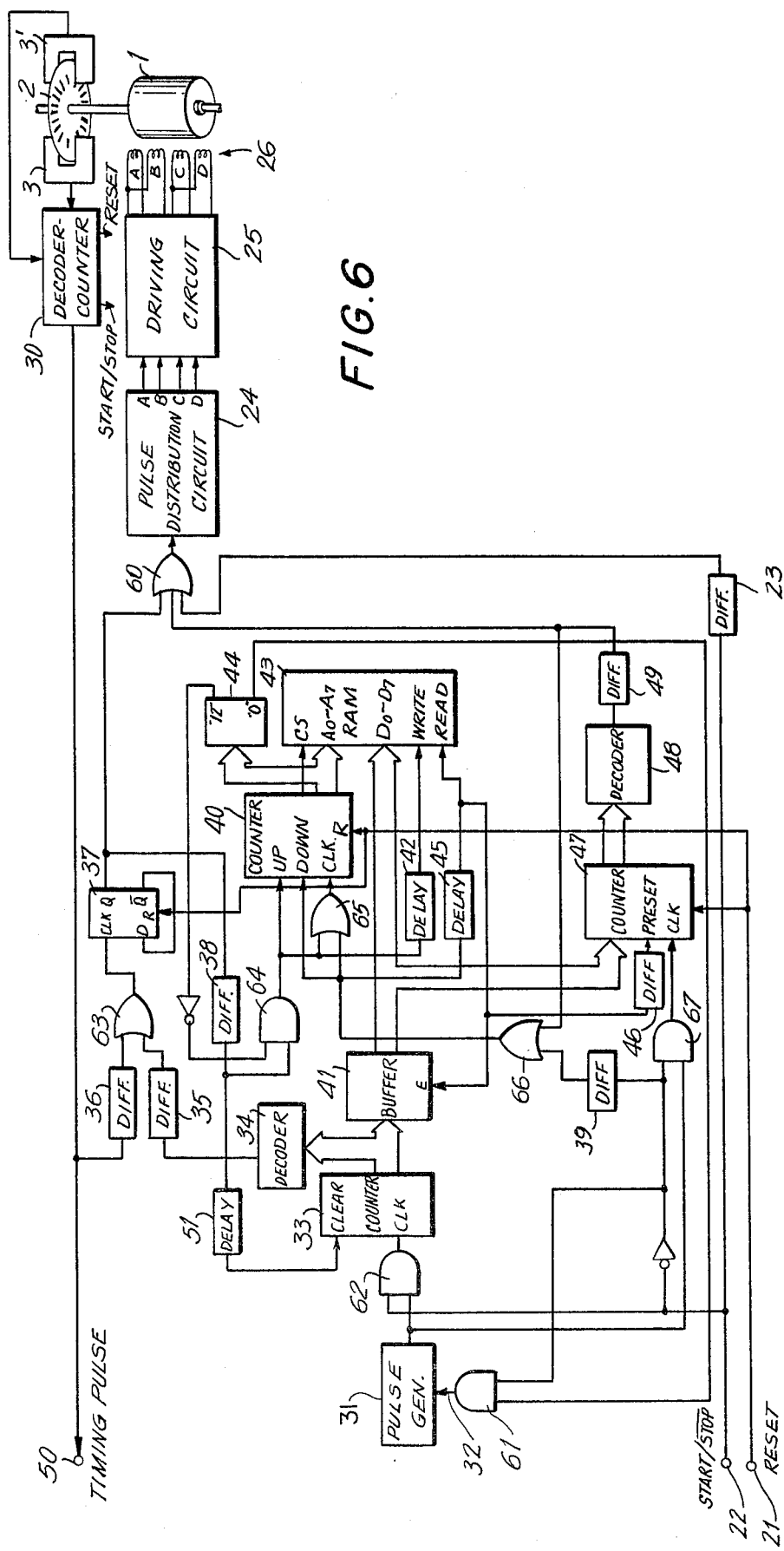
FIG. 6 is a block diagram illustrating the speed control circuit in accordance with the invention.

Turning now to FIG. 6, a specific embodiment of a speed control circuit in accordance with the invention is depicted. Motor 1 and timing disc 2 are shown in conjunction with two optical timing detectors 3 and 3', both coupled to a decoder-counter 30. Each timing detector 3, 3' produces an output signal when each slit 2a is in registration therewith. Timing detector 3 is associated with the forward direction of traverse of dot head carrier 7 while timing detector 3' is associated with the reverse or return traverse of said dot head carrier. Decoder-counter 30 distinguishes between the two timing detectors by counting the timing pulses from the rest position at one end of the traverse, although, in an alternative embodiment, the direction of rotation can be detected by the order of pulse detection dependent upon the position of the respective timing detectors. A timing pulse signal, in digital form if desired, representative of the position of the step motor, and therefore of the dot head carrier, may be applied to output terminal 50 by decoder-counter 30.

Figure 1:
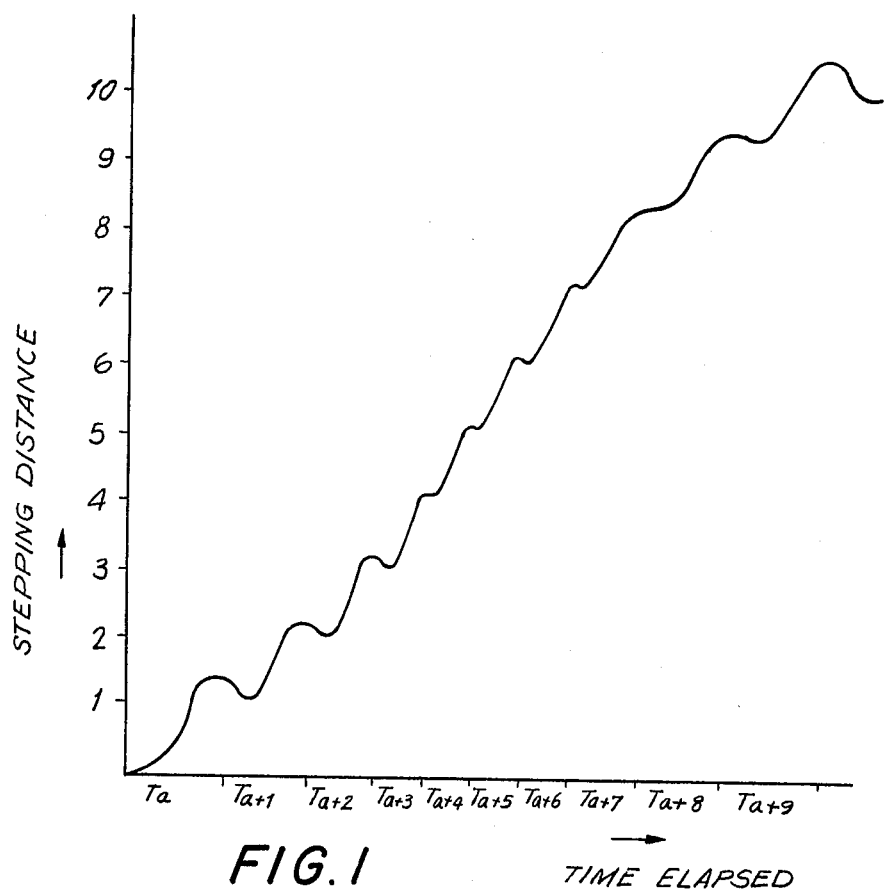
FIG. 1 is a wave form illustrating the vibration of a stepping motor driven by the conventional driving method, wherein the ordinate represents the stepping distance of the step motor and the abscissa indicates the time elapsed.
Figure 8:
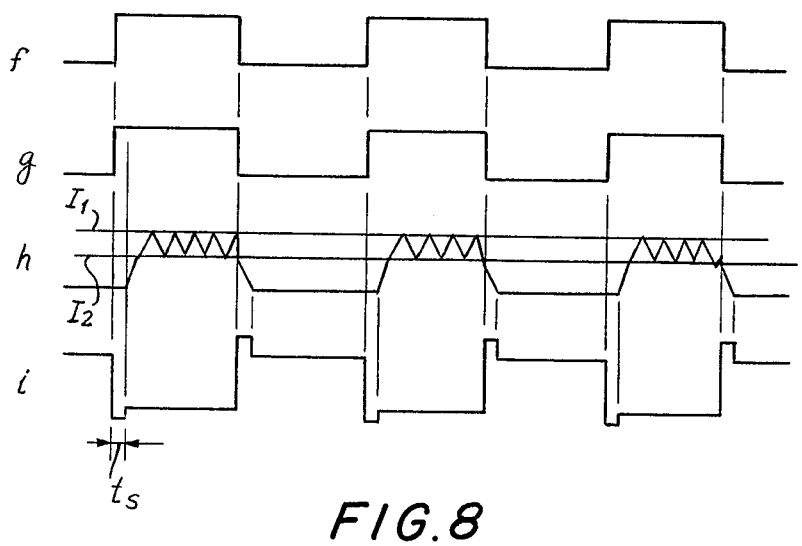
FIG. 8 depicts the wave forms at various points in the circuit of FIG. 7.
Figure 9A:
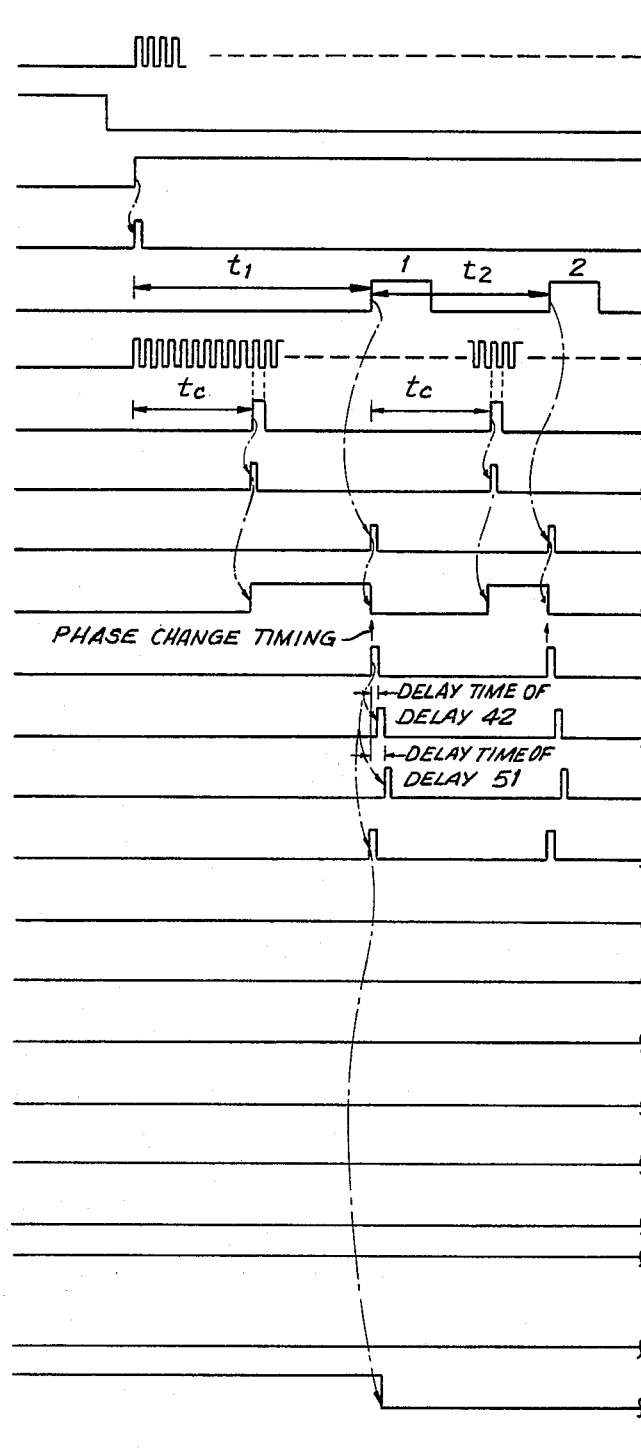
FIG. 9A and FIG. 9B depict the wave forms at various points in the circuit of FIG. 6.
Figure 9B:
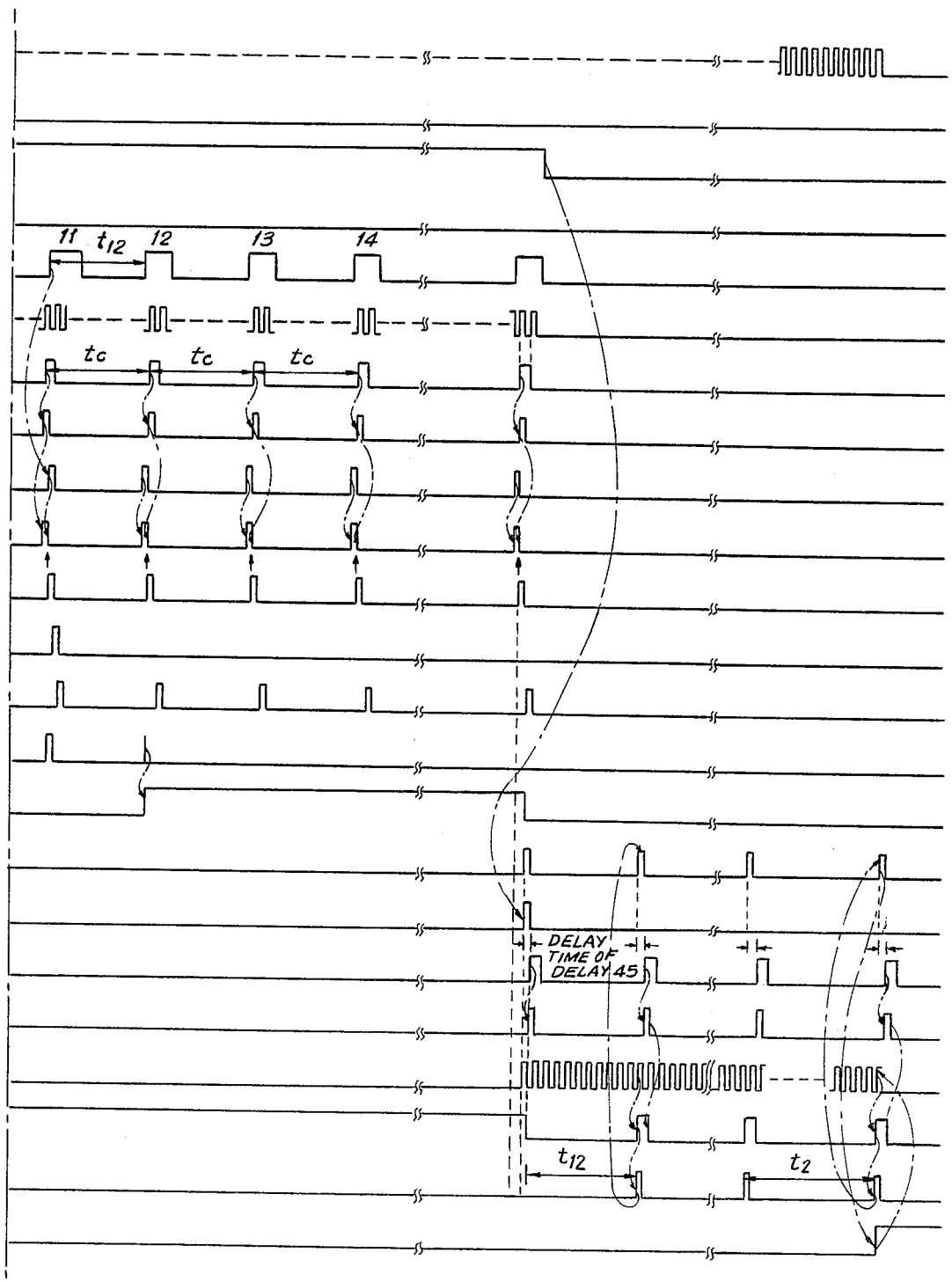

Referring now to Fig. 9A and Fig. 9B, a timing chart for the various elements of Fig. 6 and their output signals as recited below, is depicted. Start/stop signals and reset signals may be respectively applied to terminals 22 and 21, either from an external source or from decoder-counter 30, which can produce such signals in response to the count of the timing pulses. The reset pulse is applied to the circuit in order to put the various counters into a starting condition simultaneous with the start of step motor 1. The "start" signal applied to terminal 22 represents a change in state from "Low" to "High" at terminal 22. The reset signal at terminal 21 is applied to counters 33, 40 and 47 to reset these counters to "zero" simultaneous or immediately before the application of the "start" signal to terminal 22. The "start" signal applied to terminal 22 is applied to differentiation circuit 23 which produces a pulse output responsive to the change from the "Low" to the "High" state. The output of differentiation circuit 23 is applied to OR gate 60, the output of the OR gate 60 being applied to pulse distribution circuit 24 which produces a driving signal for a four phase step motor. Each pulse output from OR gate 60 causes an output from pulse distribution circuit 24 to driving circuit 25, which in turn actuates one phase of the driving coils 26 of step motor 1. Each driving signal represents a phase change sufficient to actuate the step motor. The operation of the step motor driving circuit 25 is discussed below in connection with FIGS. 7 and 8, it being sufficient to state here that the current in the respective coils is turned "on" and "off" in response to the driving signal.

Because of the actuation of the step motor, timing disc 2 advances so that a timing pulse is generated by timing detector 3 which is applied to decoder-counter 30 as discussed above.

Pulse generator 31 is adapted to have its pulse output controlled by signal 32 from AND gates 61. At the time of starting, a pulse is generated by the pulse generator 31 and input to counter 33 through AND gate 62, the other input to AND gate 62 being the "High" start signal from terminal 22. The output of counter 33 is applied to a decoder 34 adapted to produce a "High" output when the count value of counter 33 equals a period of $t_c$ as determined by the pulse period of pulse generator 31. The output of decoder 34 is applied to a differentiator circuit 35 which serves to produce a pulse when the output from decoder 34 changes from a "Low" to a "High" state, representative of the passage of the period $t_c$. Differentiation circuit 36 produces a pulse output coincident with the leading edge of each timing pulse, in other words, when the timing signal changes from a "Low" to a "High" state. The pulse output of differentiation circuits 35 and 36 is applied to an OR gate 63, the output of which is applied to a D-type flip-flop which in turn, produces one pulse when the output of both differentiation circuits 35 and 36 is input thereto. The output of flip-flop 37 is applied to pulse distribution circuit 24 through OR gate 60, whereby motor 1 is stepped in response to the detection of both the passage of the period of time $t_c$ and the next timing pulse.

Differentiation circuit 38 produces a pulse output in coincidence with the trailing edge of the output pulse from flip-flop 37. At this time, if the output from the position "12" of decoder 44 is not "High", i.e., the count value of the counter 40 is not 12, the output pulse from differentiation circuit 38 is input to an up-down counter 40 for up counting. The "12" output of decoder 44 is coupled through an inverter and AND gate 64 to the "UP" terminal of counter 40, the other input to said AND gate 64 being from the Q output terminal of flip-flop 37 through differentiation circuit 38. The output of differentiation circuit 38, when passed by AND gate 64, is also applied through a delay circuit 42 to the WRITE terminal of a RAM 43. It should also be noted that this signal is applied through OR gate 65 as a clock circuit to up-down counter 40. Also, at this time, the output of three-state buffer 41 is enabled, so that the output of counter 33, representing elapsed time for the period between phase changes, is applied through buffer 41 to the data-bus $D_0$–$D_7$ of RAM 43. The period represented by the count of counter 33 is read into the data bus at an address as determined by the count of up-down counter 40. After the data is written in to RAM 43, the output of differentiation circuit 38 is applied through delay circuit 51 to the clear terminal of counter 33 to clear the counter for the next cycle.

The foregoing describes a sequence with respect to the driving circuit during the rotation of motor 1 by one step. During the acceleration period 11, as discussed in connection with FIG. 3, a period $t_c$ passes so as to produce an output from flip-flop 34 through differentiator 35, causing flip-flop 37 to change from a "Low" to a "High" output. However, the second actuation of flip-flop 37 required to produce a phase change does not occur until the next leading edge of a timing signal is received, at which point the output of flip-flop 37 changes from "High" to "Low" and the count value of counter 43 is written in the RAM 33 as described above. Counter 33 is then cleared and the phase change is effected by means of driving pulse distribution circuit 24. In this manner, during the acceleration period, the count values of counter 33 between one step change and the next step change are successively stored in RAM 43.

While the circuit of FIG. 6 is provided with only 12 steps in the acceleration period, this is merely by way of example in order to simplify the circuit and any number of acceleration steps may be incorporated depending on the characteristics of the motor. Even if full acceleration is achieved earlier, 12 steps are memorized in RAM 43. At the end of the step change for the twelfth step, the output from position "12" in decoder 44 becomes "High", applying a signal through an inverter to AND gate 64 to prevent the application of pulses to the WRITE terminal of RAM 43 and to the clock input of counter 40.

After the acceleration period is over, the leading edge of the respective timing pulses, as indicated by the output signal of differentiation circuit 36, appears earlier than the output pulse of differentiation circuit 35 representative of the passing of the period $t_c$. In this case, the step change of motor 1 is performed at the end of the predetermined period $t_c$, so that the motor 1 rotates at a constant speed. In the course of such constant speed rotation, if too much load is added to the motor 1, step change may not occur even if the time period $t_c$ passes. This case is analogous to the acceleration period where the step change does not occur until the leading edge of the next timing pulse appears. This makes it possible for the motor speed to respond to the predetermined time period, albeit after a delay, despite the application of a load to the motor.

The motor enters the deceleration control period when there are twelve steps remaining in the traverse of the step motor. The transition to the deceleration mode is achieved by the "stop" signal at terminal 22, which may be produced by decoder-counter 30 as discussed above. Specifically, the signal at input terminal 21 is changed from a "High" to a "Low" state. This change causes an output pulse to be produced by differentiation circuit 39, the signal being applied to said differentiator through an inverter. The pulse output from differentiation circuit 39 is applied through OR gate 66 and through delay circuit 45 to READ terminal of RAM 43. At the same time, the address desired is selected by counter 40 which is coupled to the address bus $A_0$–$A_7$ of RAM 43, and counter 40 is indexed by the application of the output from OR gate 65 to the clock terminal of counter 40. The data from the data bus $D_0$–$D_7$ at the selected address is stored in counter 47 which is adapted to count down to zero. This counting is achieved through the output signals of pulse generator 31 which are applied through an AND gate 67 to the clock terminal of counter 47. The other input to AND gate 67 is from the stop signal at terminal 22, applied through an inverter. Counter 47 counts down the predetermined period until its output equals zero as determined by decoder 48. When the output of decoder 48 becomes "Low", a pulse is produced by differentiation circuit 49, which is still another input to OR gate 60 to produce a phase change through pulse distribution circuit 24. The output of differentiation circuit 49 is also applied through OR gate 66 and OR gate 65 to the clock terminal of counter 40 to effect indexing of the address. The same output of OR gate 66 is applied through delay circuit 45 to the READ terminal of RAM 43. The data of RAM 43 which is selected by counter 40 is again set in the counter 47, wherein down-count is performed until the count value comes to $\phi$. The contents of counter 47 is again counted down using the pulse signal output of pulse generator 31. This cycle produces the successive phase changes characteristic of the deceleration period 13 of FIG. 3.

Figure 7:
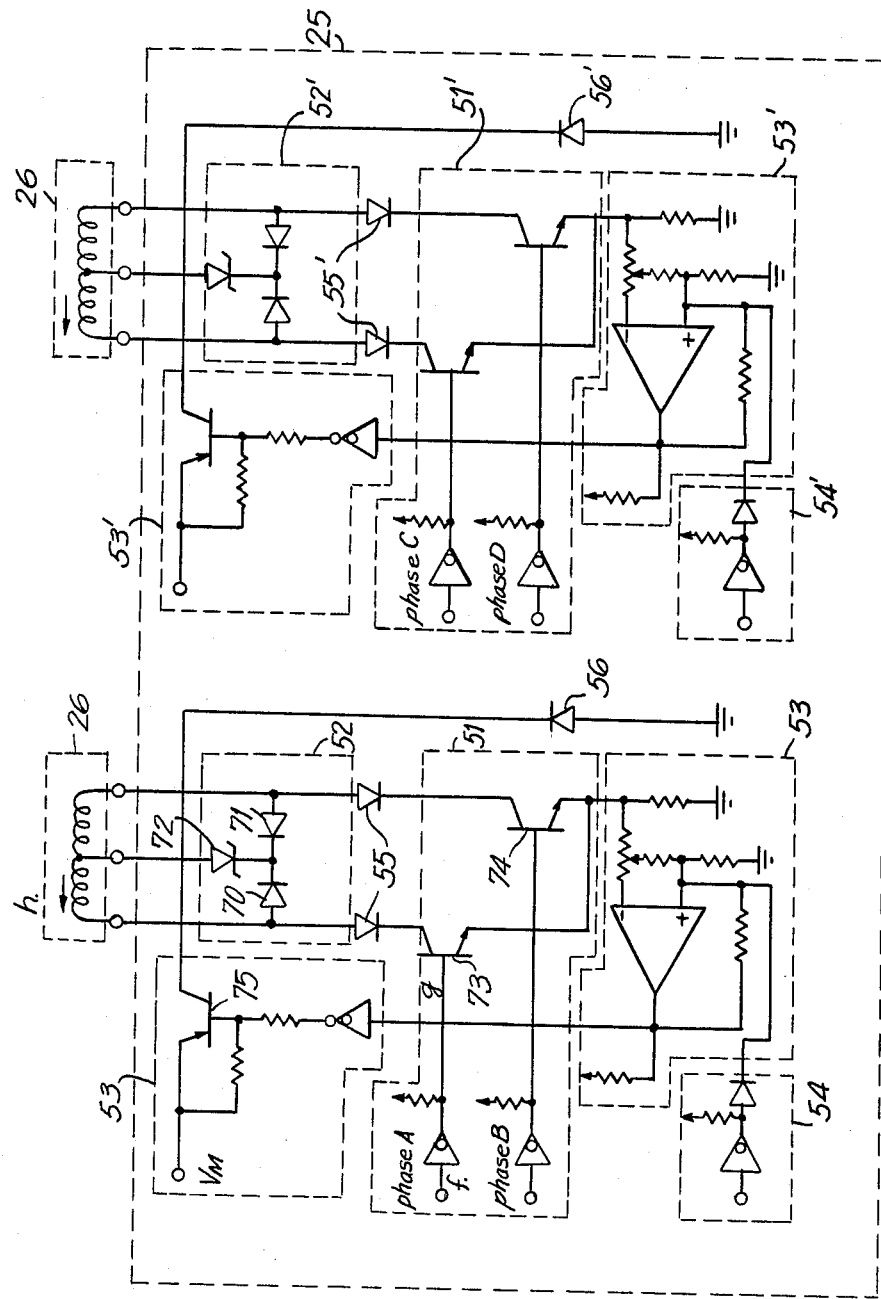
FIG. 7 is a circuit diagram of the step motor driving circuit in accordance with the invention.

Referring now to FIG. 7, the driving circuit for the coils 26 of pulse motor 1 is depicted. Wave forms f, g, h and i represent the wave forms at the points marked with corresponding letters in the circuit of FIG. 7. As is apparent from a consideration of FIG. 7, two identical circuits are provided, a first driving phase A and phase B, as defined by the left-most coils in FIG. 7, the other driving phase C and phase D as represented by the right-most coils in FIG. 7. The two circuits are identical, like elements being applied the same reference numeral, only primed. Switching circit 51 selects which of the two motor coils is to be actuated. Spike suppressor circuit 52 is connected across the coils and consists of a pair of diodes 70 and 71 and a Zener diode 72. Switching circuit for closed-loop constant current 53 is common to the two phases and is connected to the commonly connected emitters of the switching transistors 73 and 74 of switching circuit 51 for switching phases A and B respectively. A common switching circuit for closed loop constant current may be provided for phases A and B since the two phases are never simultaneously actuated, in other words, current is never applied at the same time both to the coil of phase A and the coil of phase B. The switching circuit 53 is controlled by a control circuit 54 insuring a constant current value. A diode 55 is interposed between one end of each of the coils defining phases A and B and the associated switching transistors 73 and 74 for checking inverse current caused by mutual inductance between the coils. Finally, a flywheel diode 56 is provided between ground and the common connection of the coils of phase A and B.

To supply current to the coil of phase A, as shown in wave form h in FIG. 8, the coil of phase A is not supplied with current until the time $t_s$ has passed. During the time $t_s$, the energy in the coil of phase B is consumed by the spike-suppressor circuit 52. When the time $t_s$ has passed, current begins to be supplied to the coil of phase A by the switching circuit 53. This current gradually increases. If the current reaches the level $I_1$ determined by switching circuit 53 for closed-loop constant-current, the transistor 75 of switching circuit 53 is turned off. As a result, the coil of phase A is cut off from current source $V_M$. The energy applied to the coil of phase A is consumed in transistor 73 of switching circuit 51 for motor coil current, in the coil, and also in the closed circuit of the flywheel diode 56, and gradually decreases. When the energy reaches the level $I_2$, transistor 75 is turned "on" again and the current applied to the coil of phase A is increased once again. The above-mentioned action repeats in order to control the current of the coil between $I_1$ and $I_2$.

When a phase change is to occur, in other words, when the current is to be cut off from phase A and to be applied to phase B, the spike-suppressor circuit 52 actuates so that the current supplied to the coil of the phase A falls down smoothly as shown in wave form h. The current to the coils of phase B is also constantly controlled between the current values $I_1$ and $I_2$. Further, the current to the coils of phases C and D are also constantly controlled between the current values $I_1$ and $I_2$. During the time $t_s$, inverse current produced by mutual inductance is prevented from flowing to the coil, as shown in wave form h of FIG. 8, by means of the diode for checking inverse current 55. Accordingly, there is no fear of destruction of the circuit and it is possible to provide a stable switching circuit for closed-loop constant current.

It is possible to readily change the constant current value by changing the level of wave forms shown in FIG. 8 between $I_1$ and $I_2$ in the control circuit for constant current value 54. This makes it unnecessary to prepare special motor current sources. Finally, with respect to the energy output of the motor, it is possible to reduce, as small as possible, the vibration generated by excessive input, which is normally a characteristic of step motors. It is also possible to reduce as small as possible the heat in the coil. This may be realized by the step of making the constant current value variable so that the value most properly assigned in accordance with the rotation speed of the motor is used.

In summary, the control system in accordance with the invention may control the drive of a step motor, even where the step motor is driven over relatively short incremental distances, defined by only a few steps, at high speed. Vibration of the motor is minimized by the control method and apparatus in accordance with the invention so that extremely good print quality can be realized from the dot printer incorporating the step motor in accordance with the invention. The timing pulses produced may be used to coordinate the printing of characters with the displacement of the dot head carrier. The vibration of the motor usually experienced during acceleration and deceleration can be avoided. Even if too much load is applied to the motor, so that the motor is stopped during a driving period, when the load is removed, the motor begins to revolve again by reason of the method and apparatus in accordance with the invention. Specifically, this results from the fact that the phase is never changed until the timing pulse is produced.

Accordingly, the defects in the prior art are overcome by the arrangement in accordance with the invention. It should be noted that the driving method in accordance with the invention is applicable, not only to the carrier driving mechanism of a printer, but also to other devices incorporating step motors, wherein it is desirable to drive the motor at high speed without any vibration through use of predetermined steps, for example, magnetic head driving devices.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It also to be understood that the following claims are intended to cover all of the generic and specific features of the invention herein described and all statements of the scope of the invention which, as a matter of language, might be said to fall therebetween.

What is claimed is:

1. A speed control for step motors comprising detector means for producing timing signals representative of the incremental advance of the step motor; motor driving means for actuating the step motor in response to the actuation of said motor driving means for advancing said step motor; and speed control circuit means periodically actuating said motor driving means at least in part in response to said timing signals during acceleration of said step motor, said speed control circuit means including memory means for storing the time interval between respective actuations of said motor driving means during acceleration of said step motor, said speed control circuit means being adapted to actuate said motor driving means during deceleration of said step motor at intervals which are a function of the stored acceleration intervals in said memory means applied in reverse order.

2. The speed control for step motors as recited in claim 1, wherein said speed control circuit means is adapted so that the intervals of actuation of said motor driving means during deceleration bear a fixed functional relationship to the stored acceleration intervals.

3. The speed control for step motors as recited in claim 2, wherein said speed control circuit means is adapted so that the intervals between motor driving means actuations during deceleration are substantially equal to the stored acceleration intervals.

4. The speed control for step motors as recited in claim 1, wherein said step motor is to be incrementally advanced over a short distance without a constant speed period, said speed control circuit means being adapted to periodically actuate said motor driving means in response to said timing pulses during acceleration of said step motor after an initial actuation of said motor driving means.

5. The speed control for step motors as recited in claim 4, wherein said short distance of incremental advance of said step motor is represented by an even number of timing pulses, said speed control circuit means being adapted to provide a number of actuations to said motor driving means including said first actuation equal to [(total number of timing pulses in desired incremental advance of step motor)/2]+1 during acceleration, and being further adapted during deceleration to actuate said motor driving means at intervals which are respective functions of the intervals between said first actuation and a second actuation and between successive actuations except for the last actuation during acceleration, applied in reverse order, so that the number of actuations during deceleration is equal to [(total number of timing pulses in desired incremental advance of step motor)/2]−1.

6. The speed control for step motors as recited in claim 4, wherein the desired incremental advance of said step motor is represented by an odd number of timing pulses, said speed control circuit means being adapted so that the number of intervals between actuations of the motor driving means during acceleration equals the number of intervals between actuations during deceleration, said speed control circuit means being adapted so that all of the intervals between actuations of the motor driving means during acceleration are stored including the interval between the first actuation and the first timing pulse.

7. The speed control for step motors as recited in claim 1, wherein said first-mentioned detector means is associated with the traverse of said step motor in a first direction and including a second detector means for producing timing pulses representative of the incremental advance of said step motor in the opposite direction, said speed control circuit means being adapted to detect the direction of traverse and to periodically actuate said motor driving means at least in response to the timing pulses from the one of said first-mentioned and second detector means associated with the direction of traverse of said step motor means.

8. The speed control for step motors as recited in claims 1 or 7, wherein said detector means includes a disc member mounted for rotation by said step motor and formed with circumferentially spaced apertures therethrough, and an optical detector in registration with said apertures for detecting the presence of each such aperture as said disc member rotates.

9. The speed control for step motors as recited in claim 1, wherein said speed control circuit means includes means for measuring the passage of a predetermined time period, said speed control circuit means be adapted for periodically actuating said motor driving means during the acceleration of said step motor in response to the later of the expiration of said predetermined time period and the application thereto of the next timing pulse, said speed control circuit means being adapted to reset said means for measuring said predetermined time period upon each actuation of said motor driving means during acceleration.

10. The speed control for step motors as recited in claim 9, wherein the period of acceleration is represented by a predetermined number of timing pulses, said speed control circuit means including counter means for counting the timing pulses from initial actuation, said speed control circuit means being adapted to actuate said motor drive means during deceleration a number of times equal to the number of timing pulses defining the acceleration period.

11. The speed control for step motors as recited in claim 10, wherein the traverse of said step motor includes an acceleration period, a period of desired constant speed and a deceleration period, said speed control circuit means being adapted during the period of constant speed control to actuate said motor driving means in response to the later of said predetermined time period and the next timing pulse.

12. The speed control for step motors as recited in claim 11, wherein said constant speed period represents a predetermined traverse of said step motor, said speed control circuit means including counter means for counting timing pulses applied thereto during said constant speed period for determining the initiation of deceleration.

13. The speed control for step motors as recited in claim 10, wherein said counter means is an up-down counter means for counting up at least in part in response to timing pulses during the acceleration period and for counting down at least in part in response to motor driving means actuation during deceleration, said up-down counter means being coupled to said memory means for controlling the writing in to said memory means during acceleration and the reading out of said memory means in reverse order during deceleration.

14. The speed control for step motors as recited in claim 13, wherein said speed control circuit means includes pulse generator means for producing periodic pulses; and deceleration counter means coupled to said memory means for setting by the stored interval data to a value representative of the next interval between motor driving means actuation during deceleration and coupled to said pulse generator means for counting down thereby, said speed control circuit means being adapted so that the next actuation of said motor control means during deceleration is in response to the counting down to a predetermined level of said deceleration counter means.

15. The speed control for step motors as recited in claim 14, including acceleration counter means coupled to said pulse generator means for being counted up thereby and coupled to said memory means during acceleration for writing into said memory means a value representative of a count upon the next actuation of said motor driving means, said speed control circuit means being adapted to reset said acceleration counter means upon said next actuation of said motor driving means.

16. The speed control for step motors as recited in claim 15, wherein said means for measuring said predetermined time period includes said acceleration counter means and decoder means for detecting a count of said acceleration counter means representative of said predetermined time period.

17. The speed control for step motors as recited in claim 1, wherein said step motor includes at least one pair of coils, each coil of said pair having a first end commonly connected at the first end of the other coil of the pair and a second end, a change in the coil being energized effecting a phase change in said step motor to advance said step motor, said motor driving means including current switching circuit means respectively coupled to the second end of each pair of coils for controlling the supply of current to said coils, spike-suppressor circuit means coupled between said first and second ends of said pair of coils; and a diode connected intermediate the second end of each coil of said pair of coils and the associated current switching circuit means for stopping inverse current.

18. The speed control for step motors as recited in claim 17, wherein said spike-suppressor circuit means includes a Zener diode coupled at its anode to said commonly-connected first ends of said pair of coils and a pair of diodes connected at their respective cathodes to each other and to the cathode of said Zener diode and each being connected at its respective anode to the second end of one of said coils, said diode for storing inverse current being positioned between said spike-suppressor circuit means and said switching circuit means.

19. The speed control for step motors as recited in claim 18, and including a flywheel diode coupled between ground and said commonly connected first ends of said pair of coils with the cathode thereof coupled to said coil first ends.

20. The speed control for step motors as recited in claim 17, including closed-loop constant current means for maintaining the level of current in a coil actuated by said current switching means between first and second current levels.

21. A speed control for step motors comprising detector means for producing timing signals representative of the incremental advance of the step motor; motor driving means for actuating the step motor in response to the actuation of said motor driving means for advancing said step motor; and speed control circuit means periodically actuating said motor driving means, said speed control circuit means including means for measuring the passage of a predetermined period of time from the last actuation, said speed control circuit means being adapted to actuate said motor driving means in response to the later of the expiration of said predetermined period or the occurrence of the next timing pulse.

22. A method of controlling the speed of a step motor comprising detecting the incremental advance of the step motor; periodically actuating said step motor during acceleration at least in part in response to each detected incremental advance of said step motor and actuating said step motor during deceleration at intervals which are a function of the intervals between actuation during acceleration taken in reverse order.

23. The method as recited in claim 22, wherein the interval between actuations of said step motor during acceleration is determined by the later of the expiration of a predetermined time period from the prior actuation or the detected incremental advance of said step motor.

24. The method as recited in claim 23, wherein the incremental distance for acceleration and deceleration are selected to be equal to each other and including a period of desired constant speed control during which the successive actuations of said step motor are in response to the later of the passage of a predetermined period of time or the detection of the next incremental advance of said step motor.

25. In a step motor, an improved driving circuit comprising at least one pair of coils, each coil of said pair having a first end commonly connected to the first end of the coil of the pair and a second end, a change in the coil being energized effecting a phase change in said step motor to advance said step motor, said motor driving means including current switching circuit means respectively coupled to the second end of each pair of coils for controlling the supply of current to said coils, spike-suppressor circuit means coupled between said first and second ends of said pair of coils; and a diode connected intermediate the second end of each coil of said pair of coils and the associated current switching circuit means for stopping inverse current.

26. In a step motor, an improved driving circuit as recited in claim 25, wherein said spike-suppressor circuit means includes a Zener diode coupled at its anode to said commonly-connected first ends of said pair of coils and a pair of diodes connected at their respective cathodes to each other and to the cathode of said Zener diode and each being connected at its respective anode to the second end of one of said coils, said diode for stopping inverse current being positioned between said spike-suppressor circuit means and said switching circuit means.

27. In a step motor, an improved driving circuit as recited in claim 26, and including a flywheel diode coupled between ground and said commonly connected first ends of said pair of coils with the cathode thereof coupled to said coil first ends.

28. In a step motor, an improved driving circuit as recited in claim 25, including closed-loop constant current means for maintaining the level of current in a coil actuated by said current switching means between first and second current levels.

* * * * *